(No Model.)  6 Sheets—Sheet 1.

J. SPENCER.
STONE DRESSING MACHINE.

No. 575,435. Patented Jan. 19, 1897.

WITNESSES
A. D. Harrison
P. W. Pizzetti

INVENTOR
John Spencer

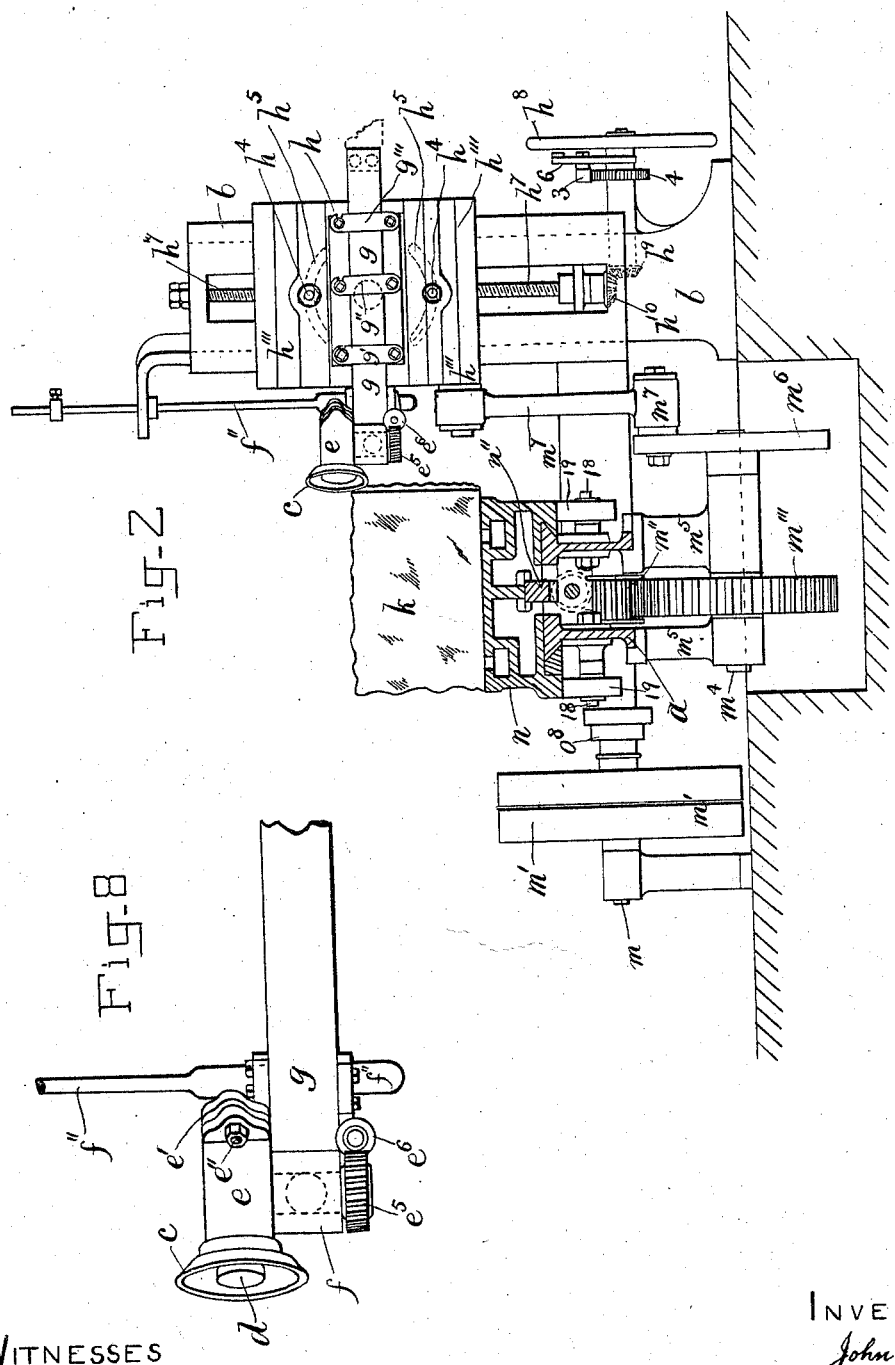

(No Model.) 6 Sheets—Sheet 3.
J. SPENCER.
STONE DRESSING MACHINE.
No. 575,435. Patented Jan. 19, 1897.
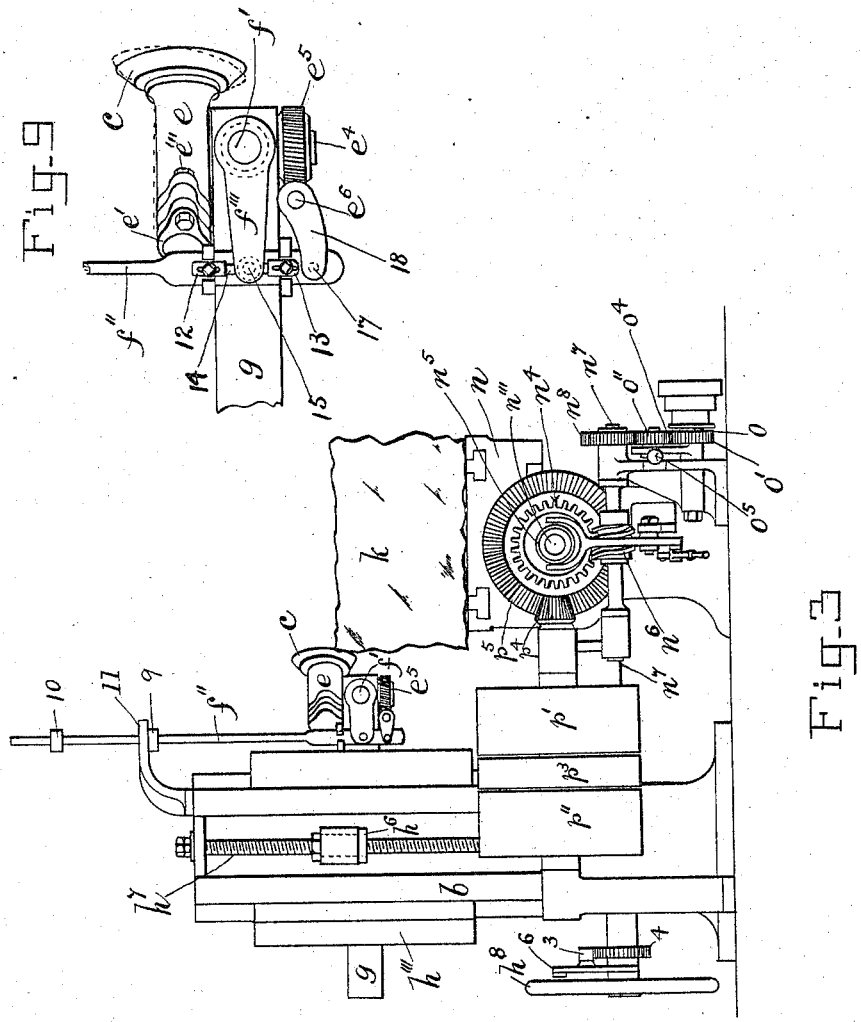
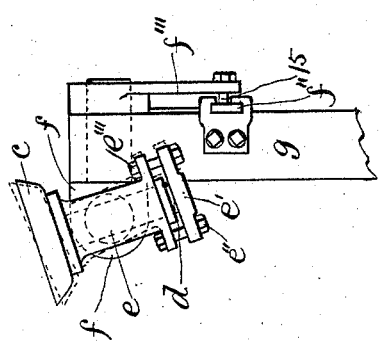
WITNESSES
A. D. Hanson
P. W. Pezzetti
INVENTOR
John Spencer (No Model.) 6 Sheets—Sheet 4.

J. SPENCER.
STONE DRESSING MACHINE.

No. 575,435. Patented Jan. 19, 1897.

Witnesses
A. D. Harrison
F. W. Pizzetti

Inventor
John Spencer (No Model.) 6 Sheets—Sheet 5.
J. SPENCER.
STONE DRESSING MACHINE.
No. 575,435. Patented Jan. 19, 1897.
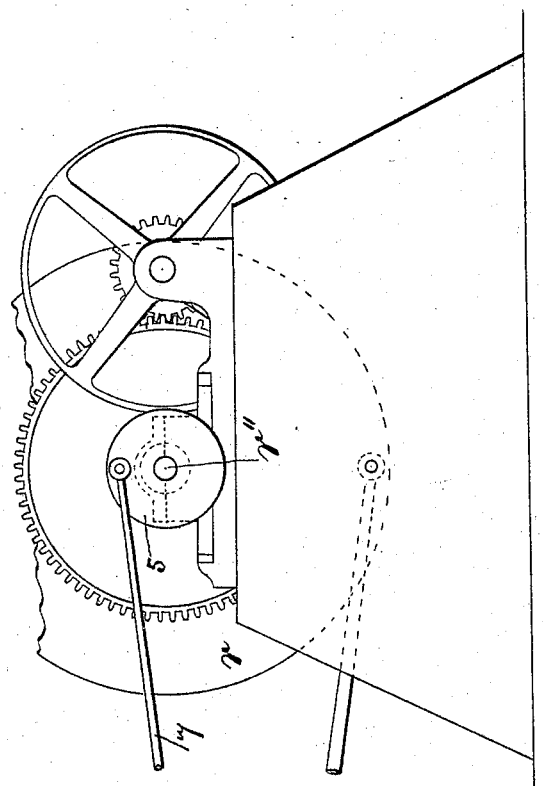
Fig-5
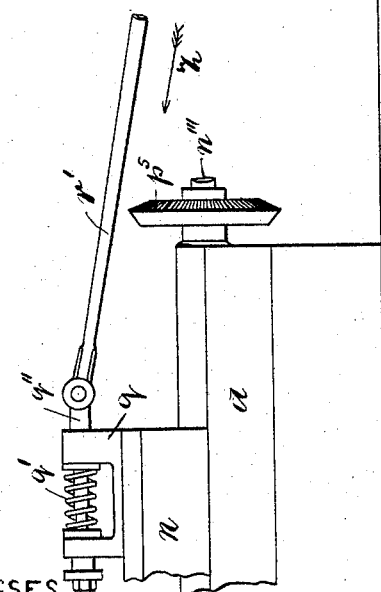
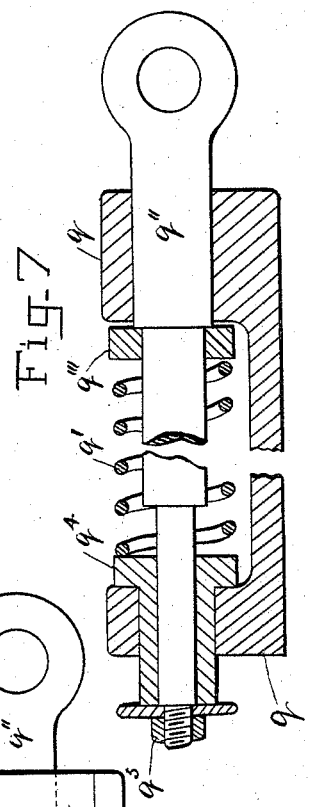
Fig-7
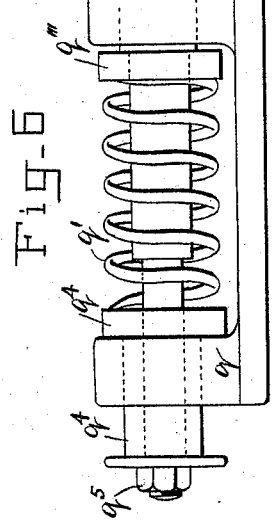
Fig-6
Witnesses
A. D. Harrison
D. W. Doggett
Inventor
John Spencer (No Model.) 6 Sheets—Sheet 6.
J. SPENCER.
STONE DRESSING MACHINE.
No. 575,435. Patented Jan. 19, 1897.
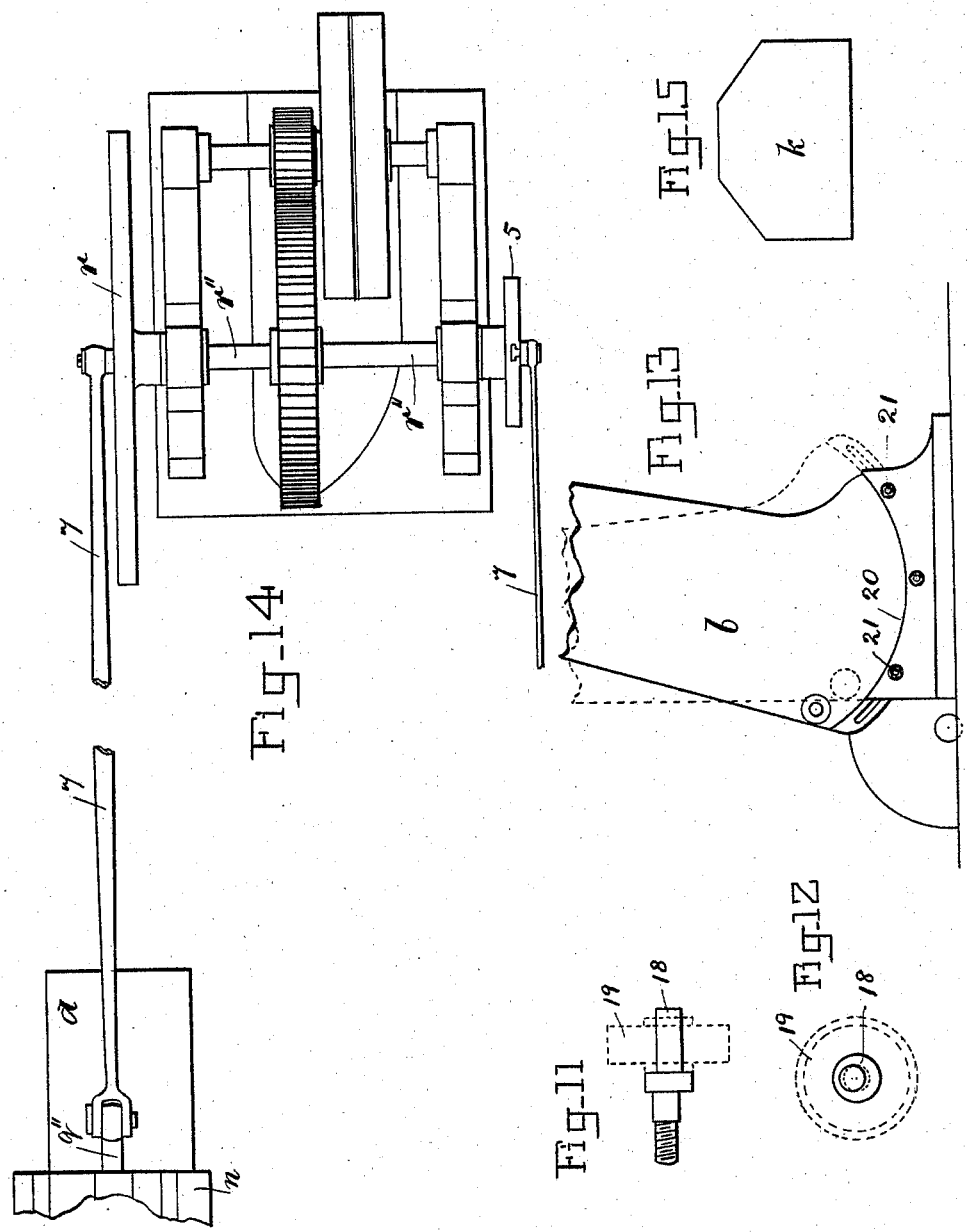
WITNESSES
A. D. Harrison.
P. W. Pizzetti.
INVENTOR
John Spencer

UNITED STATES PATENT OFFICE.

JOHN SPENCER, OF KEIGHLEY, ENGLAND.

STONE-DRESSING MACHINE.

SPECIFICATION forming part of Letters Patent No. 575,435, dated January 19, 1897.

Application filed May 27, 1896. Serial No. 593,265. (No model.)

*To all whom it may concern:*

Be it known that I, JOHN SPENCER, a subject of the Queen of Great Britain, residing at Keighley, in the county of York, England, have invented a new and useful Stone-Dressing Machine, of which the following is a specification.

My invention relates more particularly to the class of stone-dressing machines wherein rotary or disk cutters are employed, (although to a certain extent it may also be employed in connection with other machines, as will hereinafter be explained,) and, as is well known to the users of said rotary-cutter machines, considerable loss is entailed by the inability to make them perform their cutting actions over the entire surface of the stone under operation without breaking away a certain portion of same as its outer end is being approached by the cutters.

The object of this invention is to prevent this loss and produce a machine that will act or perform its cutting operations evenly over the whole surface of such parts of the stone as are desired to be operated upon, at one time (when only one rotary cutter is being used) performing what may be termed the "rough cut" on its advancing movement and the "finishing cut" on its receding or return movement, while at another time (when two or more rotary cutters are being used) it may be used to perform both of these actions at each advancing and receding movement. In each of these cases the moving of the circular cutter or cutters is rendered necessary to bring it or them into the desired position or to the most appropriate angle relatively with the line of action to enable it or them to perform its or their functions efficiently. This object I attain by the means hereinafter described, reference being had to the accompanying sheets of drawings, in which—

Figure 1:
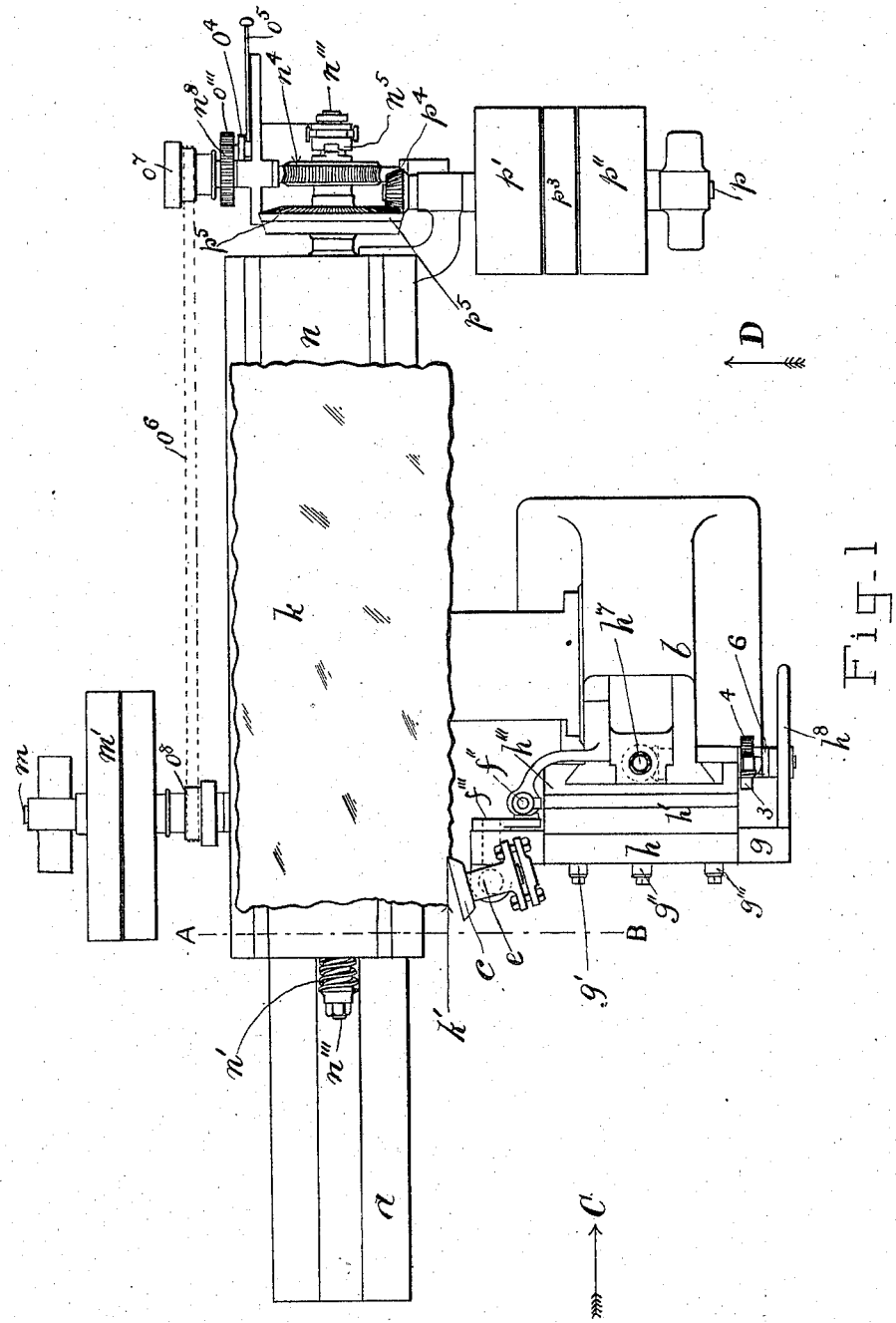
Figure 4:
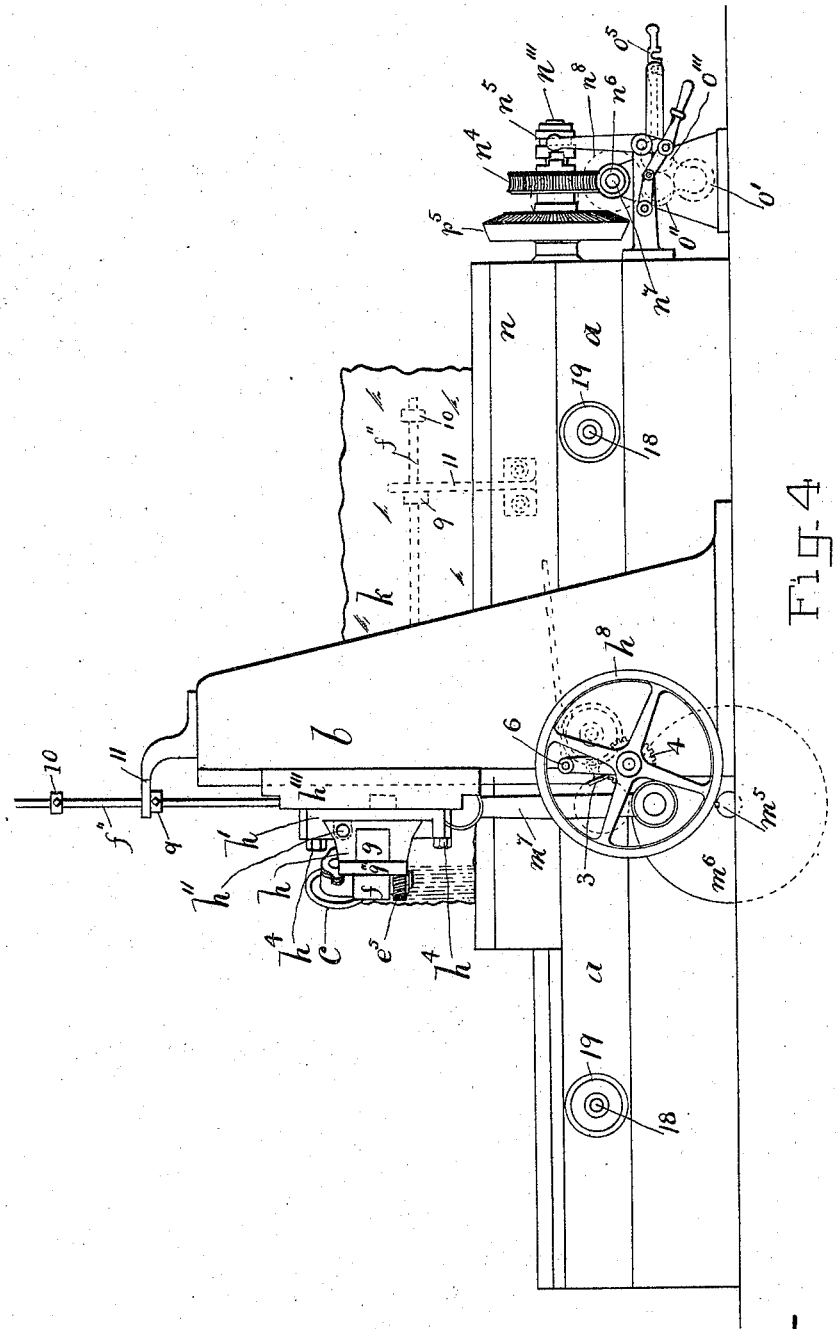

Figure 1 is a plan or view of the machine as seen from above. Fig. 2 is part sectional elevation of same on line A B and as seen in the direction indicated by arrow C. Fig. 3 is end elevation of the machine as seen in the opposite direction to that indicated by the arrow C. Fig. 4 is side elevation of the machine as seen in the direction indicated by the arrow D. Fig. 5 is a side elevation of a portion of the machine and shows the method of coupling same to an additional operating-crank. Figs. 6 and 7 are side and sectional elevations, drawn to an enlarged scale, of part shown by Fig. 5. Figs. 8, 9, and 10 are front, back, and top views of the parts for supporting and operating the cutters, these being also drawn to an enlarged scale. Figs. 11 and 12 are drawings in detail, enlarged scale, illustrating the bearing spindles or studs on which the trunnions for supporting the machine's table are mounted. Fig. 13 is side elevation similar to Fig. 4, but shows a modification in the formation of the vertical supports whereby I am enabled to make the cutters operate at any desired angle to the vertical plane, for purposes hereinafter explained. Fig. 14 is a drawing in detail of the parts shown by Fig. 5 and as seen from above. Fig. 15 is sectional end elevation of a piece of cut stone to illustrate the result attainable by certain adjustments and actions of the machine.

Similar letters and figures of reference indicate similar parts throughout the several views.

The bed $a$ and the upright $b$ constitute the principal portions of the machine's framework.

The circular cutters $c$ are mounted upon a spindle $d$, arranged to rotate freely within the bearings $e$. The forces acting thereon, being chiefly in a direction lengthwise this spindle $d$, are withstood by the cross-piece $e'$, which is secured by bolts $e''$ $e'''$ to the bearings $e$ and against which the end of the spindle $d$ abuts. The pivotal arm $e^4$ of the bearings $e$ is arranged to pass through the swivel $f$, which forms sufficient support for it and allows it to be moved therein on the wheel $e^5$, secured to it, being rotated by the worm $e^6$, carried by bearings secured to the bar $g$ and operated by the rod $f''$, as is hereinafter explained.

The swivel $f$ is mounted upon the bar $g$ by its pivotal arm $f'$ passing through it, so that the lever $f''''$ may be secured to it to enable it to be oscillated by the rod $f''$, hereinafter described.

The bar $g$ fits within the slide $h$, where it is held by the cross-pieces $g'$ $g''$ $g'''$, secured by their several screws, and by this bar $g$ being square in cross-section it will fit equally well within said box whether it is in the position therein shown by the several drawings or in a position turned quarter-way around, or if entirely turned over, so that its present upper becomes its lower surface, as will be well understood, by which formation I am enabled to adjust or arrange the cutter $c$ in the most appropriate position relatively with the bar $g$ and the piece of stone $k$ under operation by simply moving said bar $g$ and, without removing or disarranging the parts, securing said cutter $c$ to the said bar $g$.

The slide $h$ is mounted upon the box $h'$, wherein it is operated by the screw $h''$, as may be desired and in the well-known manner which is similar to the operating by hand of most slides on lathes and other tools, while the box $h'$ is swiveled on the saddle $h'''$, to which it is secured by the bolts $h^4$, taking into the circular slots $h^5$, made concentrically with the pivotal projection on said box $h'$ in order that the bar $g$ may be adjusted when desired at an angle to the horizontal plane, by which means when it is moved by its screw $h''$ it will travel in a path at said angle to the horizontal plane and so carry its cutter $c$ to act upon the surface of the stone $k$ at said angle. By this arrangement pieces of stone may be cut into the shape shown by the sectional view, Fig. 15.

When the machine is being used and the stone $k$ is being fed to the cutter $c$, then reciprocatory motion is imparted to the saddle $h'''$ from the main driving-shaft $m$ (which derives its motion from any prime motor through the pulleys $m'$) through the medium of the gear-wheel $m''$, secured to said shaft $m$, gear-wheel $m'''$, fixed on the shaft $m^4$, (carried by bearings $m^5$,) crank or plate $m^6$, fixed on said shaft $m^4$, and connecting-rod $m^7$, pivotally coupled to said crank $m^6$ and to the saddle $h'''$, while when the cutter $c$ is being fed to the stone $k$, this latter being moved or reciprocated lengthwise the bed $a$, as hereinafter described, then the connecting-rod $m^7$ is detached from the saddle $h'''$, and this latter is moved vertically by the nut $h^6$ on the screw $h^7$, being secured in the lug on said saddle $h'''$, which screw $h^7$ is manually moved by the wheel $h^8$ through the gearing-wheels $h^9$ $h^{10}$, (shown in broken lines, Fig. 2,) or this screw $h^7$ may be automatically and intermittently rotated in one direction or the other by the ratchet 3 operating the wheel 4 as it is reciprocated by the crank 5, fixed on the rotary shaft $r''$, said crank 5 being coupled to the lever 6, upon which the ratchet 3 is mounted, by means of the rod 7, as shown by Fig. 14, or it (said cutter) is moved horizontal by its screw $h''$ being rotated manually or otherwise.

The stone $k$ is fixed or mounted upon the table $n$ by the employment of any of the well-known devices at present in use for effecting this purpose, and said table $n$ is made to slide upon the bed $a$ at such times as it is being used for feeding the stone $k$ to the cutter $c$, and which is usually at a comparatively slow rate of speed, by means of the screw $n'$ taking into the rack $n''$, fixed to said table $n$, this screw $n'$ being secured to the shaft $n'''$, which is operated by its wheel $n^4$ (which is secured to it by the clutch $n^5$) gearing with the worm $n^6$, fixed to the shaft $n^7$, operated in one direction or the other, according as to whether the gear-wheel $n^8$, secured to it, is being operated by the shaft $o$ directly through the wheel $o'$ and $o''$ or through these wheels and the wheel $o'''$, (the positions of these being determined by the operative moving the swing-plate $o^4$, on which the wheels $o''$ and $o'''$ are mounted by the holding-bar $o^5$, the actions of which are well known,) the said wheel $o'$ deriving its motion from the shaft $o$, which is rotated by a belt $o^6$ (shown in broken lines, Fig. 1) from the shaft $m$ through the medium of the speed-cones $o^7$ and $o^8$, and at the time this table $n$ is being thus moved through the worm $n^6$ the driving-belts which impart motion to the shaft $p$ are on their loose pulleys $p'$ $p''$, while when a quicker movement is desired to be imparted to the table $n$ then the clutch $n^5$ is thrown out of gear and one or other of the belts on the pulleys $p'$ $p''$ (according as to which direction it is desired to rotate the shaft $p$, one belt driving it one direction, the other in the opposite direction) is shifted onto the pulley $p^3$, fixed to said shaft $p$, this latter being thereby rotated, its rotary motion being transmitted through the gear-wheels $p^4$ (which is fixed to the shaft $p$) and $p^5$, (which is fixed to the shaft $n'''$.) This quicker motion of the table is for the purpose of enabling the workman to bring the stone quickly up to the cutter when it (said stone) has been properly mounted on the table or for other purposes wherein a comparatively quick movement is thought desirable.

For the purpose of operating the table $n$ at yet a quicker speed, as is desirable when the cutting operations have to be performed by its movements, the cutter $c$ at this time being stationary, with the exception of its feed and rotary motions, which latter is at all times produced by its contact with the stone it is acting upon, the screw $n'$ is detached or taken from the shaft $n'''$ and the table $n$ is coupled through the coupling part $q$, spring $q'$, bar $q''$, and rod $r'$ to the operating-crank $r$, mounted on the shaft $r''$, deriving its rotary motion from any prime motor. The bar $q''$ is made to slide loosely in the part $q$, so that it will by its shoulder press the hoop $q'''$ against the spring $q'$, which in turn forces the shouldered bush $q^4$ against the part $q$ on the rod $r'$, moving in the direction indicated by the arrow $z$, while when it is moving in the opposite direction the nut $q^5$ at the end of the bar $q''$ forces the bush $q^4$ to press the part $q$. Thus the power of the crank $r$ is at all times exerted on the table $n$ through the resilience of the said spring $q'$, by which means the motion of the said table $n$ is more gradually arrested and reversed at each extremity of its path than it would be had no resilience to be afforded its coupling parts.

The actions of the machine are as follows: Assuming that the cutting operations have to be performed on the face $k'$ and by one cutter $c$, as shown by the drawings, then the table $n$ is moved into its position with said cutter $c$ by bringing one or other of the belts on the pulleys $p'$ $p''$ onto the pulley $p^3$, (the clutch $n^5$ being at this time out of gear.) On said table being brought thus into position the belt is shifted back onto its pulley $p'$ or $p''$, and the clutch $n^5$ is then put into gear, after which the main driving-belt is shifted onto the pulley $m'$. Thus the cutter $c$ is moved or reciprocated vertically, while as it is completing each rising and falling movement its tappets 9 and 10 are brought into contact with the stop-piece 11. Thus motion is imparted to this rod $f''$ to cause it to tilt or move the cutter $c$ by the lever $f'''$ (the greater or less extent of its said movement being prearranged by the adjusting-pieces 12 13, being fixed to lengthen or shorten the slot 14, made in said rod $f''$, the actions of said pieces 12 13 and the rod $f''$ being transmitted to the lever $f'''$ by coming into contact with the projection 15, fixed to said lever $f'''$) either from the position shown in full lines, Fig. 9, into that shown by broken lines of the same figure, or vice versa, these respective positions being merely assumed to be the right ones for the cutter $c$ to occupy when moving in its two separate directions for the purpose of illustrating its movements, since I am well aware that the class, quality, or nature of the stone to be cut might require this movement to be greater or less, as well as the inclination of the said cutter $c$ to it to be different to that illustrated, the setting of the said cutter $c$ and the amount of motion that it will be necessary to impart to it in this direction being left to the skill or judgment of the user or as to what he might find most suitable for it to do. Further, on said rod $f''$ being moved as described a portion of its motion is transmitted through the projection 17 to the lever 18, fixed on the spindle of the worm $e^6$, to the said cutter $c$ in the other direction, thus moving it from the position shown in full lines, Fig. 10, into the position shown in broken lines of same figure, or vice versa, this said motion being regulated to be sufficient to cause the cutter $c$ to take the rough cut in one direction while it falls back to take the finishing cut in the other direction, the extent of this motion also being determined as is that of its other motion last before described. When two or more cutters $c$ are mounted on the spindle $d$, this last-described motion may or may not be employed, as the user may desire or find to be advantageous.

At the time the cutter $c$ is being reciprocated vertically, as above described, the stone $k$ is fed thereto by the table $n$ being moved by the screw $n'$, which at this time is rotated by the belt $o^6$ and its several intervening parts.

To prevent the cutters $c$ from breaking away any part of the stone $k$ as the ends or extremities of same are being approached, they are mounted on the machine, say in the position shown in the drawings. Then the actions of the machine are brought into operation, as above described, to cause them to act in at one end of the stone $k$ for a certain distance, (the cutters being adjusted at this time so as not to cut to the full depth to which it will be necessary for them to go to produce the finished surface, but nearly so,) on which the motion of the machine is arrested. The cutter is turned or tilted to perform its cutting operations in the opposite direction and the table $n$ moved, so that the other and opposite end of the stone $k$ is brought into position, when the machine is again fully set in motion and the cutting operations commence in at the opposite end of the stone $k$, whence they continue until the part first acted upon is again reached and now passed over, but since only a very slight cut is at this time required at this part the force of the cutter against the surface of the stone is not sufficient to break it away, although its cutting actions are continued until the end is reached in order to leave the markings of the cutter thereon even and regular throughout the entire surface.

During the performance of the cutting operations, as above described, the crank $r$ and its several parts are disconnected from the machine and are entirely inoperative. However, when the stone $k$ has to be acted upon lengthwise its surface these several parts are brought into use, while the shaft $m$ is made inoperative and the connecting-rod $m^7$ is detached from the saddle $h'''$. The motion of the crank $r$ is then transmitted to the table $n$, while the screw $h^7$ causes the cutters $c$ to advance, as has been hereinbefore described. In this case the rod $f''$ is brought into a horizontal position and its stop-piece 11 is fixed to the table $n$, as shown in broken lines, Fig. 4.

On the crank $r$ being brought into use the table $n$ is relieved of its friction on the bed $a$ by the eccentric studs 18 of the trunnions 19 being rotated to raise these trunnions 19 sufficiently to support the table $n$ just clear of its said bed $a$. Thus these trunnions act as antifriction-bearings at this time, while when comparatively little motion is imparted to the table $n$ then they are lowered out of this position and remain inoperative.

Provided it is desired to have the cutter-markings on the stone $k$ at an angle to the vertical plane the vertical support $b$ is pivoted at 20, as shown by Fig. 13, so that it may be adjusted in any desired position by its adjusting-screws 21.

Of course it will be seen that for simple operations the ordinary straight or scraping cutters may be used in connection with my improved machine instead of the rotary ones herein described, and often these may be of great service, since when a mold has been cut or produced by the rotary cutters the markings left by these may be somewhat unsightly. Hence a scraping-tool having its cutting edge formed to correspond with the mold produced may be fixed to the opposite end of the bar $g$, (somewhat as shown in broken lines, Fig. 2,) thus to be ready for use on said bar $g$ being detached from its holder, turned over endwise, and its said scraping-tool brought into the position previously occupied by the rotary cutter, the exact contour being in this way produced with ease and precision.

Such being the nature and object of my invention, what I claim is—

1. In a stone-dressing machine, the combination of a rotary cutter, a spindle upon which said cutter is mounted, pivotal bearings for supporting said spindle, swivel-bearings for supporting said pivotal bearings, means for effecting a traverse of the cutter over the work, and means for automatically turning the said pivotal and swivel bearings on their respective pivots on the completion of the traverse of the cutter in each direction, substantially as and for the purpose described.

2. In a stone-dressing machine, the combination of a rotary cutter, a spindle upon which said cutter is mounted, a pivotal bearing supporting said spindle, a swivel-bearing supporting said pivotal bearing, an arm or lever applied to said swivel-bearing, a worm and wheel applied to the pivotal bearing with an arm or lever on the worm-shaft, a sliding rod for operating upon said arms or levers, and means for reciprocating said rod.

3. In a stone-dressing machine, the combination of a rotary cutter, a spindle upon which said cutter is mounted, pivotal bearings for supporting said spindle, swivel-bearings for supporting said pivotal bearings, means for operating said pivotal and swivel bearings, an adjustable supporting-bar, for supporting said cutter and its bearings, and a sliding holder to which said bar may be detachably secured substantially as specified.

4. In a stone-dressing machine, the combination of a saddle movably mounted on suitable supports and having arc-shaped slots, a box pivoted on said saddle and carrying bolts engaging said slots, said box having a slideway extending diametrically across its face, a sliding holder engaging said slideway, means for adjusting said holder in the slideway, and a tool-supporting bar carried by said holder.

5. In a stone-dressing machine, the combination of a saddle movably mounted on suitable supports and having arc-shaped slots, a box pivoted on said saddle and carrying bolts engaging said slots, said box having a slideway extending diametrically across its face, a sliding holder engaging said slideway, means for adjusting said holder in the slideway, a bar detachably mounted on said holder, a bearing swiveled to said bar, a bearing pivoted to said swiveled bearing, a cutting-tool journaled in said pivoted bearing, and means for adjusting said bearings, substantially as described.

6. In a stone-dressing machine, the combination of a saddle movably mounted on suitable supports and having arc-shaped slots, a box pivoted on said saddle and carrying bolts engaging said slots, said box having a slideway extending diametrically across its face, a sliding holder engaging said slideway and provided with a longitudinal recess, means for adjusting said holder, a bar square in cross-section for engagement with said recess in any one of four positions, means for confining the bar in the recess, and a cutting-tool carried by said bar.

7. In a stone-dressing machine, the combination of a saddle movably mounted on suitable supports, a box pivotally mounted on said saddle and having a slideway extending across its face, a sliding holder engaging said slideway and provided with a longitudinal recess, means for adjusting said holder, a bar square in cross-section for engagement with said recess in any one of four positions, means for confining the bar in the recess, and a cutting-tool carried by said bar.

8. In a stone-dressing machine, the combination of a reciprocating table for supporting the stone, a crank-and-pitman mechanism for reciprocating said table, a rod connected with the pitman and mounted to slide in suitable bearings on the table and having abutments, a sliding bushing surrounding the rod and extending through one of the bearings, said bushing engaging at one end with one of the abutments on the rod and being shouldered at the other end to abut the bearing, and a spring interposed between the other abutment on the rod and the shouldered end of the bushing, substantially as and for the purpose described.

9. In a stone-dressing machine the combination of rotary cutters, means for supporting these cutters, mechanism for automatically operating said cutters, sliding bearings upon which the cutters' supports are mounted, means for operating said sliding bearings a table mounted to reciprocate in proximity with said sliding bearings, adjustable trunnions for supporting said table, and means for imparting reciprocatory motion to said table substantially as herein specified.

JOHN SPENCER.

Witnesses:
HARRY ELLISON,
PICKLES BAILEY.